June 8, 1965 D. E. TRUMBULL 3,188,057
APPARATUS FOR MIXING AND DISPENSING MULTI-COMPONENT MATERIALS
Filed March 12, 1962 2 Sheets-Sheet 2
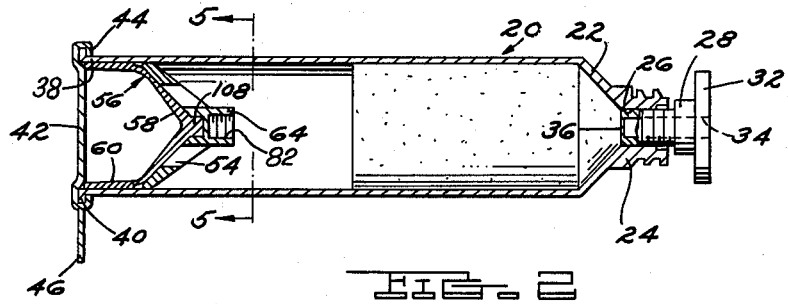
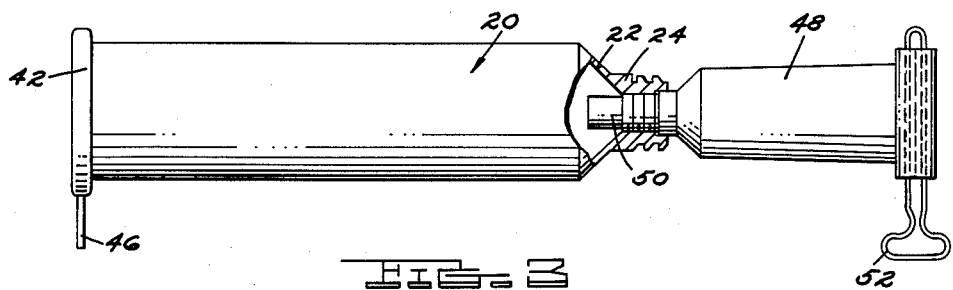
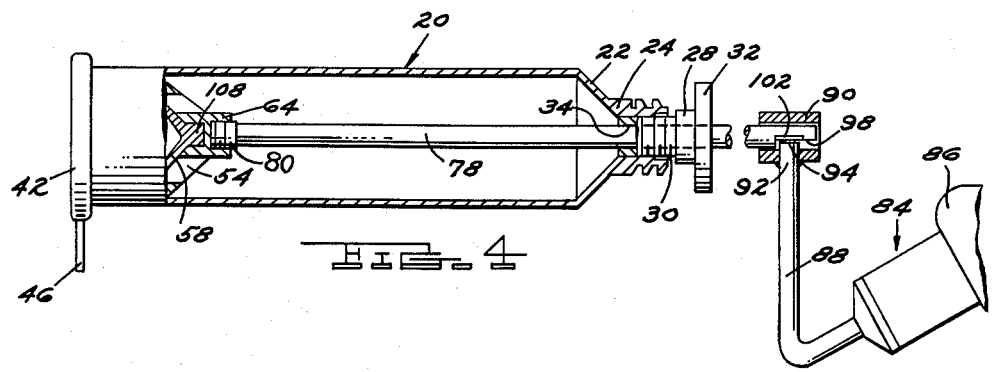
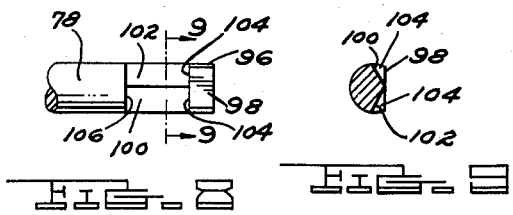
INVENTOR.
DONALD E. TRUMBULL
BY
Burton & Parker
ATTORNEYS United States Patent Office 3,188,057
Patented June 8, 1965

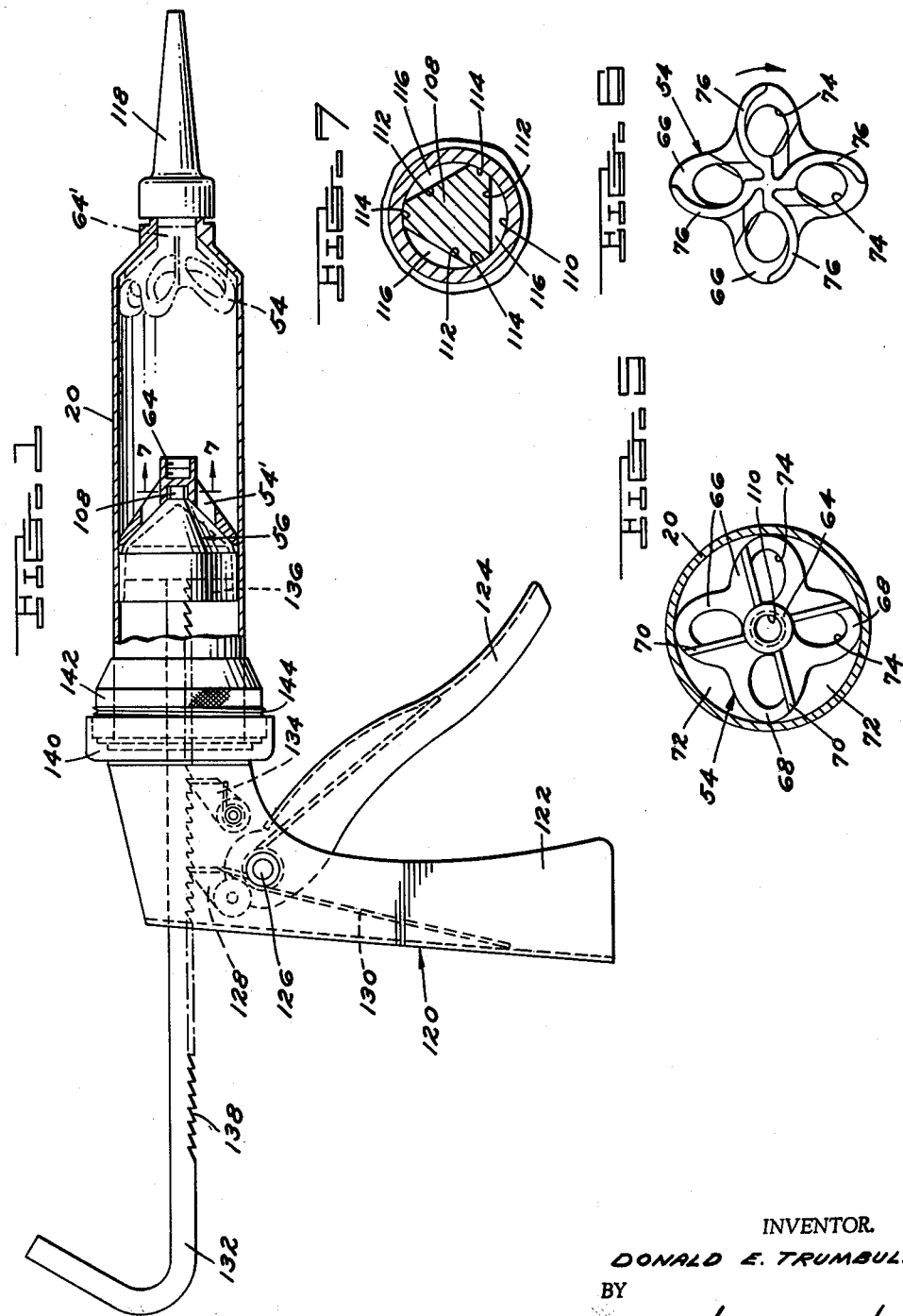

3,188,057
APPARATUS FOR MIXING AND DISPENSING MULTI-COMPONENT MATERIALS
Donald E. Trumbull, Birmingham, Mich., assignor to Pyles Industries, Inc., Southfield, Mich., a corporation of Michigan
Filed Mar. 12, 1962, Ser. No. 178,821
7 Claims. (Cl. 259—37)

This invention relates to the provision of apparatus for mixing and dispensing multi-component materials, and has particular utility wherein it is desired to provide a relatively small quantity of adhesive, sealant or the like commercially known as epoxies, polyurethanes, polyesters, etc.

These materials generally comprise a base component and a catalyst or accelerator. When the base and accelerator are mixed together, a reaction occurs between the components to effect a curing of the mixture. The time within which the mixture will cure is dependent upon the particular characteristics of the base and accelerator, the proportions of each component used, etc. In some instances the components will react and cure within a period of a few seconds.

It is obvious that in handling materials exhibiting such properties the components must be kept separate until immediately before use, and cannot be premixed prior to shipment to the user. For large quantity operations, the components are usually furnished in separate containers or drums, from which they must be removed, accurately metered in determined relative proportions, intimately mixed, and thereafter immediately used. Various apparatus are available to handle these multi-component materials in high-volume industrial operations. However, such are not intended to be used, nor are they satisfactory, for preparing a relatively small quantity of material.

Thus there has arisen, with the increasingly widespread use of these adhesives, sealants, and the like, a need for readily handling relatively small quantities of the materials in an efficient manner. Hand measuring and mixing is undesirable because of the accuracy of proportioning required and the high viscosity of some of the materials. Further, because the materials cure so rapidly after mixing, the provision of separate devices for mixing and dispensing is not practicable.

It is therefore a general object of this invention to provide a compact, inexpensive mixing and dispensing device for handling multi-component materials. As disclosed herein, the device embodying the invention comprises few parts, all of which may be cheaply manufactured, and hence may be discarded after a single use.

Another object of the invention is the provision of a mixing and dispensing device for handling small quantities of multi-component material, wherein the mixing of the components may be easily accomplished within the same container from which the resultant mixture is dispensed, thus obviating the need for providing separate mixing and dispensing apparatus.

A further object of the invention is the provision of a device for handling component materials for the preparation of sealants, adhesives, potting compounds and the like, wherein the component materials are furnished in predetermined, accurately proportioned amounts which may be combined and mixed by the user at the job without the necessity of metering or measuring the relative quantities of each component material required.

A specific object of the invention is the provision of a device for handling relatively small quantities of multi-component materials in which two containers are provided, one containing a predetermined quantity of the base component, and a second containing a predetermined quantity of the catalyst or accelerator, wherein one of the containers includes therein means for mixing the components and also means for dispensing the mixture therefrom, and the other container is provided with means for exhausting its contents into the first container to be mixed with the remaining component.

In the following description, the disclosure will be primarily directed to a device for handling sealants, adhesives, potting compounds and the like which are made up of only two components, a base and an accelerator. However, it will be apparent that such a device may be provided for handling materials consisting of more than two individual components, without departing from the invention disclosed herein.

Other objects, advantages and meritorious features will more fully appear from the specification, claims and accompanying drawings wherein:

FIG. 1 is a side view of a preferred embodiment of my invention shown positioned in a manually operated dispensing gun;

FIG. 2 is a longitudinal cross-sectional view showing a dasher and a piston disposed within a cartridge holding the base component;

FIG. 3 is a side view showing the accelerator being introduced into the cartridge for mixing;

FIG. 4 is a side view similar to FIG. 3, partly in section, showing the mixing of the components within the cartridge;

FIG. 5 is a plan view of the mixing dasher for mixing the components within the cartridge taken along the line 5—5 of FIG. 1;

FIG. 6 is a plan view of the opposite surface of the mixing dasher of FIG. 5, showing the opposite face of the dasher;

FIG. 7 is an enlarged cross-sectional view taken along the line 7—7 of FIG. 1, showing the connection between the piston and the moving dasher;

FIG. 8 is an enlarged partial plan view of the end of the mixer shaft of FIG. 4 adapted to be coupled to the mixing tool; and FIG. 9 is a cross-sectional view taken along line 9—9 of FIG. 8.

Referring now to the drawings, there is shown a preferred embodiment of a container or cartridge 20 made of a suitable plastic material such as polyethylene or the like. It should be noted that while a preferred form of container is shown in the drawings and described in some detail hereinafter, any other suitable container may be utilized within which the component materials may be mixed and which exhibits discharge means for dispensing the resulting mixture from the container. The container must be of a material which will not deteriorate or chemically react with the materials to be mixed and dispensed, and must in addition be fluid-impervious, non-brittle at low temperatures, and relatively tough and resilient. Polyethylene is excellently suited to this use. Cartridge 20 as shown is a cylindrical container having a conical forward end 22 terminating in a spout-like prolongation 24, which is provided with an aperture 26 therethrough. A plug 28 is provided for sealing aperture 26 against the escape of material, and has an externally threaded length 30 engageable with corresponding internal threads on the spout 24, and an outer end 32 of such configuration as may be conveniently gripped in the hand of the user to facilitate its insertion and removal. Plug 28 exhibits an axial aperture 34 therethrough sealed at its inner end by a frangible membrane 36 to seal the spout 24 during transportation and/or storage of the cartridge prior to use.

The open rear end 38 of cartridge 20 is provided on its outer periphery with an annular bead or flange 40.

Normally positioned over the open end 38 is a cap 42 having an inner circumferential recess 44 therearound defining a lip adapted to engage bead 40 to seal the end of the cartridge. Cap 42 is preferably made of polyethylene or other suitable material possessing the same properties as does the cartridge 20, and must be flexible and deformable enough to be easily removed from the cartridge, but at the same time of sufficient resiliency to grippingly engage the bead 40 when placed on the cartridge to seal the open end 38. Cap 42 may be provided with a projecting tab 46 to facilitate its removal from the cartridge immediately prior to use, as hereinafter explained more fully.

Cartridge 20 is partially filled with one of the component materials, usually the base component, although not necessarily. If the ratio of the compound is eight parts of base component to one part of accelerator component, it would be obviously desirable, as a practical matter, to put the base component in the cartridge, and to transfer the accelerator into the cartridge, rather than vice versa. A second separate container is provided for the other component, in this case the accelerator. As shown in FIG. 3, a tube 48 may be used to house the accelerator, which tube has a threaded hollow nose 50 which may be threadedly engaged within the spout 24. Any suitable means (not shown) may be utilized to seal tube 48 prior to use. When it is desired to combine the components for mixing, plug 28 is removed from the cartridge, then the nose 50 of the tube is threaded into the spout 24, and component in the tube 48 exhausted into cartridge 20 as by winding the tube upon a key or the like 52. It should be noted that tube 48 will be filled at the factory with the predetermined amount of accelerator component necessary to react with the predetermined quantity of base component placed in the cartridge to provide the desired mixture. Thus the containers are prefilled with the requisite quantity of their respective components to achieve an accurately proportioned mixture, and no metering or measuring is necessary prior to use. The contents of tube 48 may therefore be completely discharged into cartridge 20 and the two components thereafter mixed, resulting in a properly proportional compound or mixture.

As the materials which the device is designed to handle must be intimately mixed to provide a homogeneous compound, and since they are sometimes quite viscous at ordinary atmospheric temperatures, they cannot be mixed by shaking, as might be done with more liquid materials. To ensure adequate mixing within the cartridge 20, a dasher 54 is disposed for rotatable reciprocable movement within the cartridge. Once the material is thoroughly mixed, means must be provided for dispensing it from the cartridge and to this end a material piston 56 is shiftably disposed within the cartridge and is normally positioned at the rear end of the cartridge 20 (as shown in FIGS. 2 and 4), with the dasher 54 lying immediately forward of the piston. Obviously, it is desirable to expel as much of the material as possible from the cartridge during dispensing, for any residue remaining in the cartridge is wasted. Of course, the dasher 54 could be removed from the cartridge after mixing, but this would be a time-consuming operation, and would be quite a messy procedure with the viscous compounds handled. Hence the dasher 54 has been designed to occupy as little space as possible in the cartridge 20, so that substantially all the material may be dispensed from the cartridge without the necessity of removing the dasher. The following description of the dasher and piston serves to indicate how this may be accomplished in a practical manner.

The piston 56 is preferably made of polyethylene or the like, similar to the cartridge 20, and is constructed having a forwardly tapering wall portion 58 and a rearwardly extending skirt portion 60, which latter portion closely fits the inside of the cylindrical cartridge 20. When force is applied to the piston to urge it toward the forward wall 22 of the cartridge, the skirt will wipe along the walls of the cartridge and prevent material escapement rearwardly of the piston as it is shifted. The extreme forward end of the piston exhibits a projecting nipple or nose 62 which is adapted to engage the dasher 54 and hold it normally in juxtaposition on the piston, as will more fully appear hereinafter.

The dasher 54 is preferably made out of polyethylene or other suitable material having the same characteristics of chemical inertness, etc. as the other parts of the device which contact the materials. The dasher, however, must in addition be quite rigid so as not to deform or collapse even when being propelled through a quite viscous material. In order that the least possible residue of material remain in cartridge after use, the dasher 54 must displace a minimum volume within the cartridge 20. The rearwardly facing surface of the dasher therefore conforms to and closely fits the forwardly tapering wall 58 of the piston 56, as shown in FIGS. 1, 2 and 4. As shown in FIGS. 5 and 6, the dasher 54 has a hub 64 and a plurality of thin blades 66 which project outwardly and rearwardly from the hub in a modified four leaf clover configuration. Each blade 66 has an outer end portion 68 which contacts the inside surface of the cartridge 20, and scrapes along such surface as the dasher is shifted within the cartridge. FIG. 5 shows the forwardly facing surface of the dasher. Projecting forwardly from the blade surfaces are ribs 70 which serve to apply shear forces to the material and to sweep the material into the spaces 72 between adjacent blades as the dasher is shifted toward the forward end of the cartridge while simultaneously being rotated. In addition, each blade has an aperture 74 therein through which material may pass.

Referring particularly to FIG. 6, which is a view of the rear surface of the dasher 54, the surface which lies adjacent the piston 56, it can be seen that each blade has a rearwardly projecting rib 76. The dasher 54 is so constructed so that the ribs 76 lie along the trailing edge of the blades 66 as the dasher is rotated. Thus for optimum mixing, the dasher should be rotated in the direction indicated by the arrow in FIG. 6, that is, in a clockwise direction as the dasher is viewed from the rear. Upon rotation of the dasher in the direction of the arrow while it is being simultaneously shifted toward the rear of cartridge 20, the ribs 76 not only serve to shear thin layers of material, but also function to urge the material radially inwardly in spiral paths toward the hub 64, and thence through the apertures 74.

Summarizing the mixing action achieved by the dasher 54, when it is being simultaneously rotated and shifted from the position shown in FIGS. 2 and 4 to the position indicated in phantom outline at 54' in FIG. 1, the ribs 70 sweep through the material, applying shear forces thereto, and in addition cause a portion of each successive layer of material to follow a tortuous path along the ribs 70 toward the wall of cartridge 20, from whence it may pass through the spaces 72 between adjacent dasher blades 66 and the cartridge wall. The ribs 70 closely conform to the configuration of the tapered forward wall 22 of cartridge 20 and are adapted to scrape across the wall 22, leaving no residue of material in the cartridge not thoroughly mixed. As the dasher 54 is shifted in the opposite direction (from the forward end of cartridge 20 toward piston 56) while being rotated, each of the ribs 76 on blades 66 operates to shear off layers of the material and to urge the material along the ribs in a spiral motion inwardly toward hub 64 in a tortuous path, whereby a considerable portion of the material will pass through the apertures 74 as the dasher is shifted. Further, the ribs 76 closely conform to the forward wall 58 of the piston, and when the dasher comes into contact with the piston, the ribs 76 scrape across the piston face to ensure that no residue of unmixed components will remain along the surface of the forwardly facing piston wall. From the above it can be seen that the dasher 54 is peculiarly adapted to intimately mix component materials to provide a homogeneous mixture. A further feature of the dasher 54 is that the hub portion 64 projects forwardly of the blades 66, as indicated for example in FIG. 1. When the dasher is shifted all the way forward within the cartridge 20, as at 54' in FIG. 1, the hub 64 projects into the aperture 26 in the spout 24 of the cartridge. Thus the hub 64 displaces any material from the aperture 26 and forces it out through the aperture 26 of the cartridge, so that a minimum residue of mixed material is left within the cartridge when the dasher 54 and plunger 56 have been shifted all the way forward within the cartridge.

Referring particularly to FIG. 4, there is shown a mixing shaft 78 having a threaded inner end portion 80 adapted to be threadedly engaged within a correspondingly threaded aperture 82 (FIG. 2) in hub 64 of the dasher 54. The shaft 78 is sized to be slidably received through aperture 34 in plug 28, and the sliding fit therebetween is preferably tight enough to prevent material escape during mixing while permitting rotation and shifting of the shaft relative to the plug. On the outer end of shaft 78 is mounted a suitable tool 84 which may be manually manipulated to simultaneously rotate and reciprocate the shaft 78 and dasher 54 within the cartridge.

The tool 84 comprises a handle 86 (only partially shown), an arm 88, and a sleeve 90 rigidly secured to the arm as by welding, or in any other suitable fashion. Handle 86 is rotatably coupled to arm 88 by means of any suitable swivel connection (not shown). The inner diameter of sleeve 90 is just slightly oversize the shaft 78 so that it may be easily slipped over the end of the shaft. The end 92 of arm 88 projects into the sleeve 90 to provide a flat face 94 adapted to engage the shaft during use, as pointed out herebelow. Referring to FIGS. 8 and 9, the shaft 78 has an end portion 96 cut away to provide a flat face 98 to provide clearance for the end 94 of arm 88 as the sleeve is engaged upon the rod. Spaced inwardly from the end of the shaft 78 are a pair of flat faces 100 and 102, angularly displaced from face 98, as shown in FIG. 9.

As the mixing tool 84 is engaged with shaft 78 for mixing the materials in cartridge 20, the sleeve 90 is positioned so that face 94 on arm 88 slides past face 98 on the shaft, and becomes positioned opposite the faces 100 and 102, as shown in FIG. 4. As arm 88 is rotated through an arc in either a clockwise or counterclockwise direction, face 94 abuts the shaft face 100 or 102, and upon further rotation the shaft 78 is rotated with the tool 84, which in turn rotates the dasher 54 within cartridge 20. As previously noted, dasher 54 must be simultaneously rotated and longitudinally shifted within the cartridge. Thus as the tool 84 is pulled in a direction away from the cartridge to shift the dasher in one direction, projection 92 will abut one of the faces 104, preventing disengagement of sleeve 90 and shaft 78. Conversely, as the tool is shifted in the opposite direction, projection 92 abuts the shoulder 106. Thus, as long as torque is being applied to the tool during its shifting movement, arm portion 92 will be held against longitudinal shifting relative to the shaft 78. When the mixing operation is completed, tool 84 may be easily disengaged from shaft 78 by rotating sleeve 90 relative to the shaft so that the end face 94 of arm 88 may pass over the cut away end of the shaft. Of course, the shaft and dasher may be operated in any other suitable fashion, as by coupling the shaft to the chuck of a portable electric drill or the like.

In order to prevent the dasher 54 from becoming displaced within the cartridge 20, it has been found advantageous to provide a releasable connection between the dasher 54 and piston 56 to retain the dasher in axial alignment. The piston 56 is so constructed that it cannot become disaligned in the cartridge because the skirt portion 60 closely engages the inner wall of cartridge 20, as is obvious from an examination of FIGS. 1 and 2. A releasable connection which has been found to work particularly well is shown most clearly in FIG. 7, wherein the piston 56 is provided with an axially forwardly projecting nose 108 which projects into a suitably sized aperture 110 in the rear of the hub 64 on dasher 54 to hold the dasher in axial alignment within cartridge 20. Nose 108 is shaped in cross-section as shown in FIG. 7, and exhibits flat surfaces 112 separated by relatively short arcuate portions 114. Upon assembly with dasher 54 the flat surfaces 112 define spaces 116 between the nose 108 and the dasher 54, obviating the possibility of hydraulic lock between the two members, so that the dasher may be easily disconnected from the piston 56. The relatively short arcuate portions 114 engage the walls of dasher recess 110 to normally hold the dasher in alignment within the cartridge, but the area of contact between the mating surfaces is relatively small, so there is no tendency for the piston 56 to be shifted within the cartridge 20 as the dasher is uncoupled from the piston. Thus during mixing the dasher may be rotated relative to the piston while the nose 108 is engaged within the aperture 110, in which position the ribs 76 on the dasher will scrape across the forward wall 68 of the piston 56, and sweep material therefrom to be mixed.

In one preferred embodiment of the invention, the base component is placed within the cartridge 20 and the accelerator component 48 is placed in the tube or the like 48. Usually the base component is the dominant component, and thus is for ease of handling placed in the cartridge 20. However, the ratio of base to accelerator may be one to one, in which instance it would make little difference which component were placed in the cartridge. The base may be introduced through either end of cartridge 20, whichever is more convenient, and the respective ends of the cartridge closed by plug 28 and cap 42 for storage, with the dasher 54 and piston 56 disposed in the cartridge as shown in FIG. 2. When it is desired to dispense material to a localized area, the procedure may be as follows:

The cartridge 20 is placed in upright position (spout 24 facing upwardly), and the base component allowed to flow to the bottom or rear end thereof. If the base component is quite viscous, the cartridge 20 may be tapped to urge the base away from the spout to make room for the accelerator component. Plug 28 is then unscrewed from spout 24 and laid aside, and the nose 50 of tube 48 unsealed and threaded into the spout 24 as shown in FIG. 3. Key 52 may then be used to discharge the accelerator into cartridge 20. When tube 48 is completely exhausted, the correct proportional amounts of each component are contained in the cartridge, and the tube is then removed and discarded. The level of material in the cartridge should be below the spout 24 to permit easy re-engagement of plug 28.

To position the shaft 78 for mixing, the threaded end 80 is inserted through aperture 34 in plug 28, breaking the frangible membrane 36, and the shaft is inserted into the cartridge and threadedly engaged with aperture 82 on dasher 54. Plug 28 may be threaded into spout 24 before insertion of the shaft, or the shaft and plug may be first assembled and then threaded into the dasher and spout respectively. Hand tool 84 or any other suitable means for rotating shaft 78 is thereupon coupled to the shaft, and the apparatus is then as shown in FIG. 4, ready to mix the components together.

When mixing by hand, the cartridge may be grasped in one hand and the handle 86 of tool 84 in the other hand, and mixing accomplished by turning hand tool 84 while at the same time shifting cartridge 20 and tool 84 toward and away from each other. Care should be exercised to assure that the dasher 54 contacts the forward wall 24 and the piston 56 during each stroke so that no material will be left unmixed within the container. Many materials exhibit marked color differences between components, and the degree of mixing may be ascertained by inspecting the color of material at the surface of the cartridge, making sure the mixture is uniform throughout the length of the cartridge. If the components are of similar color, adequate mixing may be assured by counting the strokes of the shaft as the mixing is done. It has been found that a pattern of about five revolutions of the dasher per single stroke end to end and about thirty strokes should be sufficient to mix most materials. However, some materials may require more mixing, and it is better to overmix than to leave unmixed material in the cartridge. As the materials will start to cure as soon as the components are placed in contact with each other, the mixing should be completed as rapidly as possible. Thus, for material having a very short cure time, it may be desirable to mix the components by coupling the shaft to a small electric rotary device, such as a portable electric drill or the like of well known construction readily available from various sources.

When mixing is completed, the shaft 78 should be inserted as far as possible into the cartridge 20, returning dasher 54 to its position in engagement with piston 56, as shown in FIG. 4. Shaft 78 is then unscrewed from dasher 54, it being usually necessary to grasp cartridge 20 adjacent dasher 54 and squeeze the cartridge against the dasher to prevent the latter from turning with the shaft. Plug 28 is then unthreaded from spout 24 and discarded. Spout 24 is provided with external threads 98 for threaded engagement with a nozzle or the like 118 (see FIG. 1). Nozzle 118 may be of any suitable shape to fit the particular application, and is positioned in threaded engagement on the spout prior to dispensing material from the cartridge.

In FIG. 1 there is shown a hand held gun 120 which may be utilized to dispense the mixed material to a desired location. In general, gun 120 comprises a handle 122 with a trigger 124 pivotally mounted as at 126 thereon and carrying a dog 128. Trigger 124 is biased away from handle 122 by a spring 130. A toothed rod 132 is slidably rotatably journaled in handle 120, as shown. A second dog 134 is pivotally mounted on the handle, and both dogs 128 and 134 are spring-tensioned against the rod 132 to provide a ratchet-like movement. Rigidly mounted on the forward end of rod 134 is a plunger 136 which is receivable within the skirt portion 60 of piston 56, and is preferably sized to urge the skirt into intimate contact with the cartridge wall to assist in preventing material seepage past the piston during dispensing. Rod 132 has teeth 138 along one edge thereof, and upon pressure gripping of trigger 124, dog 128 engages a tooth 138, urging the rod forwardly. Upon release of trigger 124, dog 134 holds the rod 132 against reverse movement. Secured to handle 122 is a forwardly opening, cup-shaped receiver 140 adapted to receive the rear end of cartridge 20. A sleeve 142 closely encircles cartridge 20 and has an externally threaded length 144 threadedly receivable within receiver 140, trapping the flange or bead 40 on the cartridge between members 140 and 142. Rod 134 extends slidably, rotatably through suitable apertures in handle 122, and may be rotated to disengage teeth 138 from dogs 128 and 134, whereby the rod may be selectively shifted relative to the handle without manipulation of trigger 124.

To assemble the cartridge 20 in the gun 120, rod 132 is retracted as far as possible, disposing plunger 136 within receiver 140. Prior to assembly, closure cap 42 (see FIGS. 2, 3 and 4) is removed from cartridge 20 as by grasping tab 46 and disengaging the cap from the bead 40. Sleeve 142 is slipped over cartridge 20, and the rear end of the cartridge inserted against the rear wall of the receiver, whereupon sleeve 142 is threaded into receiver 140, trapping the bead 40 therebetween to securely hold the cartridge suspended in the gun. Rod 132 is then rotated to a position engaging teeth 138 with the dogs 128 and 134, and the trigger 124 depressed until material appears at the end of nozzle 118. Material may then be dispensed to the desired location through nozzle 118 by manipulation of trigger 124 to urge the plunger 136 and piston 56 toward the forward end of cartridge 20.

While the manually operated gun 120 has been shown and described to indicate a preferred mechanism for dispensing the mixture from its container, it will be obvious to one skilled in the art that alternate means could be provided to dispense the mixture. For instance, a fluid pressure operated gun could be provided wherein the piston 56 would be shifted within the cartridge 20 by the application of fluid pressure thereagainst.

What is claimed is:

1. In apparatus of the character described, a hollow cartridge having opposite open ends and provided with a movable wall portion normally disposed at one of said ends and axially resistingly shiftable toward the opposite end of the cartridge to force material therein out of such opposite end, dasher means disposed within the cartridge in coaxial alignment with said wall portion, said dasher means positioned normally in juxtaposition with the wall portion and being rotatable and longitudinally shiftable within said container toward and away from said wall portion to mix material contained within the container, and means normally releasably coupling said dasher and said wall portion together to retain said dasher in coaxial alignment with said wall portion within the cartridge.

2. In apparatus of the character described, an elongate hollow cartridge having a forward end portion defining a nozzle opening and an open rear end; a piston slidably disposed axially within the container at the rear end thereof and shiftable toward said forward end to dispense material through said opening; a dasher rotatably reciprocably disposed axially within the container having a rear surface closely conforming to the adjacent surface of the piston and a forward surface congruent with the inner surface of the forward end of said cartridge for wiping engagement of said dasher surfaces against the corresponding surfaces of said cartridge and plunger respectively during movement of the dasher within the cartridge, and means normally releasably connecting said piston and said dasher together to retain said dasher in axial alignment within the cartridge, and releasable to permit reciprocation and rotation of the dasher within the cartridge relative to the piston.

3. In apparatus of the character described, a mixing dasher for mixing together a plurality of curable component materials, comprising an axially extending central hub, a plurality of thin flat mixing blades integral with said hub and projecting radially outwardly and rearwardly therefrom, with each blade terminating in a curved outer end portion spaced from adjacent blades to permit material passage therebetween, each blade having an opening therethrough spaced from the blade periphery through which material may pass, with at least some of said blades exhibiting integral ribs projecting from opposite surfaces of the blades and positioned thereon to direct material through said openings upon simultaneous rotation and reciprocation of the dasher through the material.

4. In apparatus of the character described, a manually operated tool for manipulating a mixing dasher to mix component materials together comprising: a shaft having an inner end portion adapted to be releasably coupled to said dasher and a cylindrical outer end portion; a handle; an arm freely rotatably mounted on said handle and projecting from one end of the handle, said arm terminating in a sleeve-like portion slidably receivable over the outer end of said shaft; said sleeve provided with an abutment projecting within the sleeve intermediate opposite ends thereof normal to the sleeve axis; said shaft exhibiting a flat longitudinally extending face at said outer end thereof to permit engagement of the shaft within said sleeve, and an undercut on the shaft angularly offset with respect to the flat face and adjacent said face to provide a radially extending shoulder at opposite ends of the undercut; said sleeve being axially slidably receivable over the outer end of the shaft with said abutment of the sleeve in aligned confrontation with the flat face of the shaft, and with said shoulders on the shaft preventing relative axial shifting between the sleeve and the shaft when the abutment of the sleeve is positioned radially opposite said undercut and when the abutment is simultaneously disposed out of alignment with the flat face on the shaft.

5. Apparatus of the character described comprising, in combination: a cylindrical plastic cartridge having an open rear end and a forward wall provided with an internally threaded nozzle opening through which material may be dispensed; an externally threaded tubular plug engaged within said nozzle opening and having a frangible wall sealingly closing said opening; movable wall means normally disposed adjacent the cartridge rear end of the cartridge and shiftable toward the nozzle opening to dispense material therefrom; a mixing dasher disposed for rotation and reciprocation within the cartridge intermediate said movable wall means and said nozzle opening, and having rod-engaging means thereon facing such opening; and a mixing rod having one end releasably couplable with said rod-engaging means on the dasher and operable to break said frangible wall of the plug, and an opposite end defining means for operating said dasher, said tubular plug being sized to slidably encircle said mixing rod to supportingly guide the rod during its movement and to wipingly engage the rod upon its withdrawal from the cartridge.

6. Apparatus for mixing together a plurality of flowable component materials and dispensing the resultant mixture comprising, in combination: a cylindrical cartridge for one component material having an open rear end and a forward end having an internally threaded prolongation defining a reduced diameter opening, said cartridge being of sufficient volume to accommodate all of said materials; a container for another of said materials having an externally threaded spout-like nozzle threadedly engageable within said forward end opening of the cartridge, said container including means for exhausting the contents thereof into said cartridge through said opening; movable wall means disposed normally adjacent the rear end of said cartridge and shiftable toward the forward end to dispense mixture from said reduced diameter opening; a mixing dasher rotatably reciprocably positioned in the cartridge intermediate said movable wall and said forward end having rod-engaging means thereon facing said reduced diameter opening; and a mixing rod having an end portion insertable into said cartridge through said reduced diameter opening and releasably couplable to said engaging means on the mixing dasher and an opposite end portion defining means for operating said mixing dasher to mix the component materials together within the cartridge for subsequent dispensing through said reduced diameter opening upon withdrawal of said mixing rod.

7. In a device for mixing together a plurality of component materials for subsequent dispensing of the resultant mixture: a cylindrical plastic cartridge having an open rear end and a conical forward end provided with a nozzle opening therethrough at its apex; a cup-shaped plastic plunger having a cylindrical portion extending rearwardly from a conically shaped forward end portion with said cylindrical portion adapted to closely contact the interior cylindrical wall of said cartridge; a mixing dasher slidably receivable within said cartridge for reciprocable and rotation movement therewithin, said dasher having a rear surface configuration conforming to the conical forward end portion of said plunger for wiping contact thereagainst and a forward surface configuration conforming to the interior conical wall surface of said cartridge for wiping engagement thereagainst and exhibiting an axially forwardly projecting hub portion provided with means for releasably coupling the dasher to an actuating member; said plunger having an integral pin projecting forwardly from the apex of its conical forward end portion and said dasher provided with a corresponding cooperating recess in its rear surface, with said pin releasably grippingly receivable within said recess to disconnectably couple said plunger and said dasher together for insertion as a unit into said cartridge.

References Cited by the Examiner
UNITED STATES PATENTS

| | | | |
|---|---|---|---|
| 585,837 | 7/97 | Bliss | 259—141 |
| 1,388,042 | 8/21 | Hunter | 259—140 |
| 1,486,394 | 3/24 | Smith. | |
| 1,954,143 | 4/34 | Morrison | 259—140 |
| 1,989,019 | 1/35 | O'Keeffe. | |
| 2,166,437 | 7/39 | Howie et al. | 259—47 |
| 2,370,759 | 3/45 | Thompson | 259—47 |
| 2,441,649 | 5/48 | Sprague | 222—92 |
| 2,477,200 | 7/49 | Penny | 222—92 |
| 2,528,530 | 11/50 | Machleder | 141—386 X |
| 2,671,577 | 3/54 | Remington et al. | 222—92 |
| 2,831,606 | 4/58 | Alters | 259—47 |
| 2,954,144 | 9/60 | Flam et al. | 259—98 X |
| 2,997,281 | 8/61 | Remington et al. | 259—141 |
| 3,013,697 | 12/61 | Gill | 222—145 X |
| 3,047,275 | 7/62 | Cox | 259—4 |
| 3,051,452 | 8/62 | Nobel | 259—4 |
| 3,028,052 | 4/63 | Archer | 222—136 |

CHARLES A. WILLMUTH, *Primary Examiner.*